United States Patent
Smith

(10) Patent No.: US 8,516,233 B2
(45) Date of Patent: Aug. 20, 2013

(54) METHOD FOR SETTING A BOOT LIST TO DISKS WITH MULTIPLE BOOT LOGICAL VOLUMES

(75) Inventor: Mark Douglas Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 12/961,314

(22) Filed: Dec. 6, 2010

(65) Prior Publication Data

US 2012/0144176 A1 Jun. 7, 2012

(51) Int. Cl.
*G06F 9/00* (2006.01)

(52) U.S. Cl.
USPC ............................................ 713/1; 713/2

(58) Field of Classification Search
USPC ................................................. 713/1, 2, 100
See application file for complete search history.

(56) References Cited

U.S. PATENT DOCUMENTS

| | | |
|---|---|---|
| 6,434,628 B1 | 8/2002 | Bowman-Amuah |
| 6,727,920 B1 * | 4/2004 | Vineyard et al. ............... 715/810 |
| 6,941,518 B2 | 9/2005 | French et al. |
| 7,480,793 B1 * | 1/2009 | Marsh ................................ 713/2 |
| 7,673,132 B2 | 3/2010 | Chu et al. |
| 2005/0083749 A1 * | 4/2005 | Keohane et al. ............... 365/222 |
| 2009/0049293 A1 | 2/2009 | Jiang |

OTHER PUBLICATIONS

"AIX Updates with Multibos", IBM Systems Magazine, Apr.-May 2008, pp. 1-4.

* cited by examiner

*Primary Examiner* — Paul Yanchus, III
(74) *Attorney, Agent, or Firm* — Yee & Associates, P.C.; David A. Mims, Jr.

(57) ABSTRACT

A method dynamically determines the contents of a Boot Logical Volume from within a System Management Service menu. Responsive to receiving the scan request, a system dynamically scans a root volume group to identify special files associated with the various base operating systems stored on the boot logical volumes of the root volume group. The system then maps the files to a specific operating systems version, and presents a list of the available operating systems on the various boot logical volumes to a user.

18 Claims, 3 Drawing Sheets

METHOD FOR SETTING A BOOT LIST TO DISKS WITH MULTIPLE BOOT LOGICAL VOLUMES

BACKGROUND

1. Field

The disclosure relates generally to a computer implemented method, a data processing system, and a computer program product. More specifically, the disclosure relates to a computer implemented method, a data processing system, and a computer program product to dynamically scanning various Boot Logical Volumes within a system to determine various operating systems and versions of operating systems located thereon.

2. Description of the Related Art

A hierarchy of structures is used to manage disk storage. Each individual disk drive, called a physical volume (PV) has a name, such as /dev/hdisk0. Every physical volume in use belongs to a volume group (VG). All of the physical volumes in a volume group are divided into physical partitions (PPs) of the same size. For space-allocation purposes, each physical volume is divided into five regions (outer_edge, inner_edge, outer_middle, inner_middle and center). The number of physical partitions in each region varies, depending on the total capacity of the disk drive.

Within each volume group, one or more logical volumes (LVs) are defined. Logical volumes are groups of information located on physical volumes. Data on logical volume appears to be contiguous to the user but can be discontiguous on the physical volume. This allows file systems, paging space, and other logical volumes to be resized or relocated, to span multiple physical volumes, and to have their contents replicated for greater flexibility and availability in the storage of data.

Each logical volume consists of one or more logical partitions (LPs). Each logical partition corresponds to at least one physical partition. If mirroring is specified for the logical volume, additional physical partitions are allocated to store the additional copies of each logical partition. Although the logical partitions are numbered consecutively, the underlying physical partitions are not necessarily consecutive or contiguous.

Logical volumes can serve a number of system purposes, such as paging, but each logical volume serves a single purpose only. Many logical volumes contain a single journaled file system (JFS or JFS2). Each JFS consists of a pool of page-size (4 KB) blocks. When data is to be written to a file, one or more additional blocks are allocated to that file. These blocks might not be contiguous with one another or with other blocks previously allocated to the file. A given file system can be defined as having a fragment size of less than 4 KB (512 bytes, 1 KB, 2 KB).

After installation, the system has one volume group (the rootvg volume group) consisting of a base set of logical volumes required to start the system and any other logical volumes specified to the installation script. Any other physical volumes connected to the system can be added to a volume group. The physical volume is added either to the root volume group or to another volume group. Logical volumes can be tailored using commands, a menu-driven System Management Interface Tool (SMIT) interface, or a Web-based System Manager.

The Advanced Interactive Executive (AIX) operating system, available from International Business Machines, Inc., allows a system manager to create multiple instances of AIX on the same root volume group (rootvg). The multibos setup operation creates a standby Base Operating System (BOS) that boots from a distinct Boot Logical Volume (BLV). Thus, the multibos setup operation creates two bootable instances of the Base Operating Systems on a given root volume group. The system can boot from either instance of the Base Operating Systems by specifying the respective Boot Logical Volume as an argument to the bootlist command, or using system firmware boot operations.

AIX allows an operator to simultaneously maintain two bootable instances of a Base Operating System per root volume group by using the multibos utility. The instance of a Base Operating System associated with the booted Boot Logical Volume is the active Base Operating System. The instance of a Base Operating System associated with the Boot Logical Volume that has not been booted is the standby Base Operating System.

The multibos utility allows the system manager to access, install, maintain, update, and customize the standby Base Operating System either during setup or during any subsequent customization operations. Installing maintenance or technology level updates to the standby Base Operating System does not change system files on the active Base Operating System. This customization of the standby Base Operating allows for concurrent update of the standby Base Operating System, while the active Base Operating System remains in production.

The various Boot Logical Volumes existing on a system can be determined by using the AIX bootlist command of a System Management Service menu. The bootlist command allows the user to display and alter the list of possible boot devices from which the system may be booted. When the system is booted, the system will scan the devices in the list and attempt to boot from the first device it finds containing a boot image. The bootlist command allows the system manager to manage the bootable devices. The normal boot list designates possible boot devices for when the system is booted in normal mode. The service boot list designates possible boot devices for when the system is booted in service mode. The previous boot device entry designates the last device from which the system booted.

Support of these boot lists may vary from platform to platform. A boot list can be displayed or altered only if the platform supports the specified boot list. It may even be the case that a particular hardware platform does not support any of the boot lists.

When searching for a boot device, the system selects the first device in the list and determines if it is bootable. If no boot file system is detected on the first device, the system moves on to the next device in the list. As a result, the ordering of devices in the device list is extremely important. If a mismatch arises between the various Boot Logical Volumes, or worse the system becomes unbootable, a user has no way of discerning the various operating systems residing in a particular Boot Logical Volume from within a System Management Service menu.

SUMMARY

According to one embodiment of the present invention, a method is provided for dynamically determining the contents of a Boot Logical Volume from within a System Management Service menu. Responsive to receiving the scan request, the system dynamically scans a root volume group to identify special files associated with the various base operating systems stored on the boot logical volumes of the root volume group. The system then maps the files to a specific operating systems version, and presents a list of the available operating systems on the various boot logical volumes to a user.

DETAILED DESCRIPTION

Figure 1:
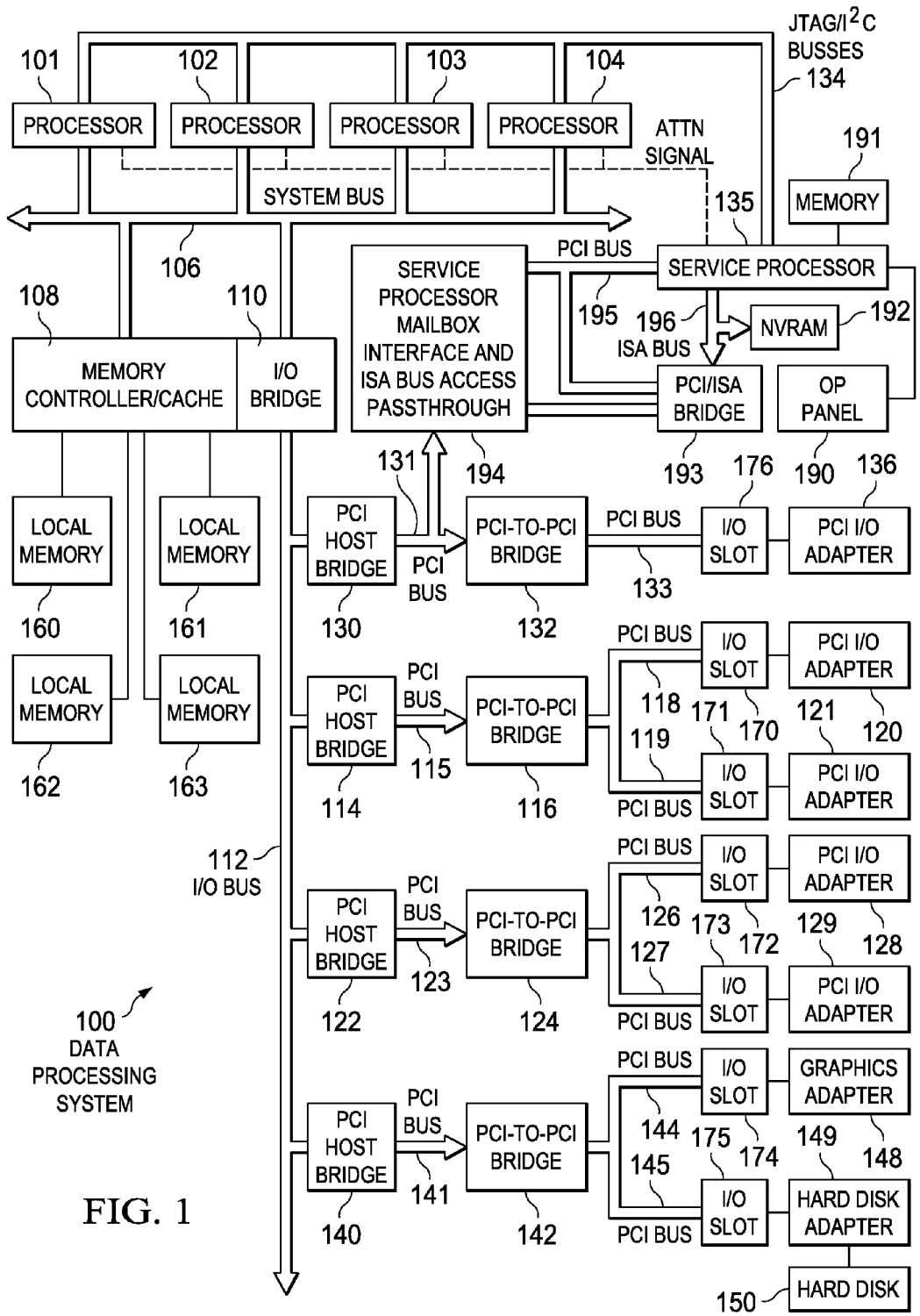
FIG. 1 is a block diagram of a data processing system in which illustrative embodiments may be implemented is depicted.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and, in particular, with reference to FIG. 1, a block diagram of a data processing system in which illustrative embodiments may be implemented is depicted. Data processing system 100 may be a symmetric multiprocessor (SMP) system including processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to local memories 160, 161, 162, and 163. I/O bridge 110 connects to system bus 106 and provides an interface to I/O bus 112. Memory controller/cache 108 and I/O bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120, 121, 128, 129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120, 121, 128, 129, and 136, graphics adapter 148, hard disk adapter 149, each of host processors 101, 102, 103, and 104, and memory from local memories 160, 161, 162, and 163 is assigned to each of the three partitions. In these examples, memories 160, 161, 162, and 163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160, 161, 162, and 163, and I/O adapters 120, 128, and 129 may be assigned to logical partition P1; processors 102 and 103, some portion of memory from local memories 160, 161, 162, and 163, and PCI I/O adapters 121 and 136 may be assigned to partition P2; and processor 104, some portion of memory from local memories 160, 161, 162, and 163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. PCI I/O adapters 120 and 121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e., expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128 and 129. PCI I/O adapters 128 and 129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access passthrough 194 and PCI-to-PCI bridge 132. Service processor mailbox interface and ISA bus access passthrough 194 forwards PCI accesses destined to the PCI/ISA bridge 193. NVRAM storage 192 connects to the ISA bus 196. Service processor 135 connects to service processor mailbox interface and ISA bus access passthrough logic 194 through its local PCI bus 195. Service processor 135 also connects to processors 101, 102, 103, and 104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I$^2$C busses 134 to interrogate the system (host) processors 101, 102, 103, and 104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101, 102, 103, and 104, memory controller/cache 108, and I/O bridge 110. Any error information for failures detected during the BISTs, BATs, and memory tests are gathered and reported by service processor 135.

If a meaningful and valid configuration of system resources is still possible after taking out the elements found to be faulty during the BISTs, BATs, and memory tests, then data processing system 100 is allowed to proceed to load executable code into local (host) memories 160, 161, 162, and 163. Service processor 135 then releases host processors 101, 102, 103, and 104 for execution of the code loaded into local memory 160, 161, 162, and 163. While host processors 101, 102, 103, and 104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101, 102, 103, and 104, local memories 160, 161, 162, and 163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to illustrative embodiments.

Figure 2:
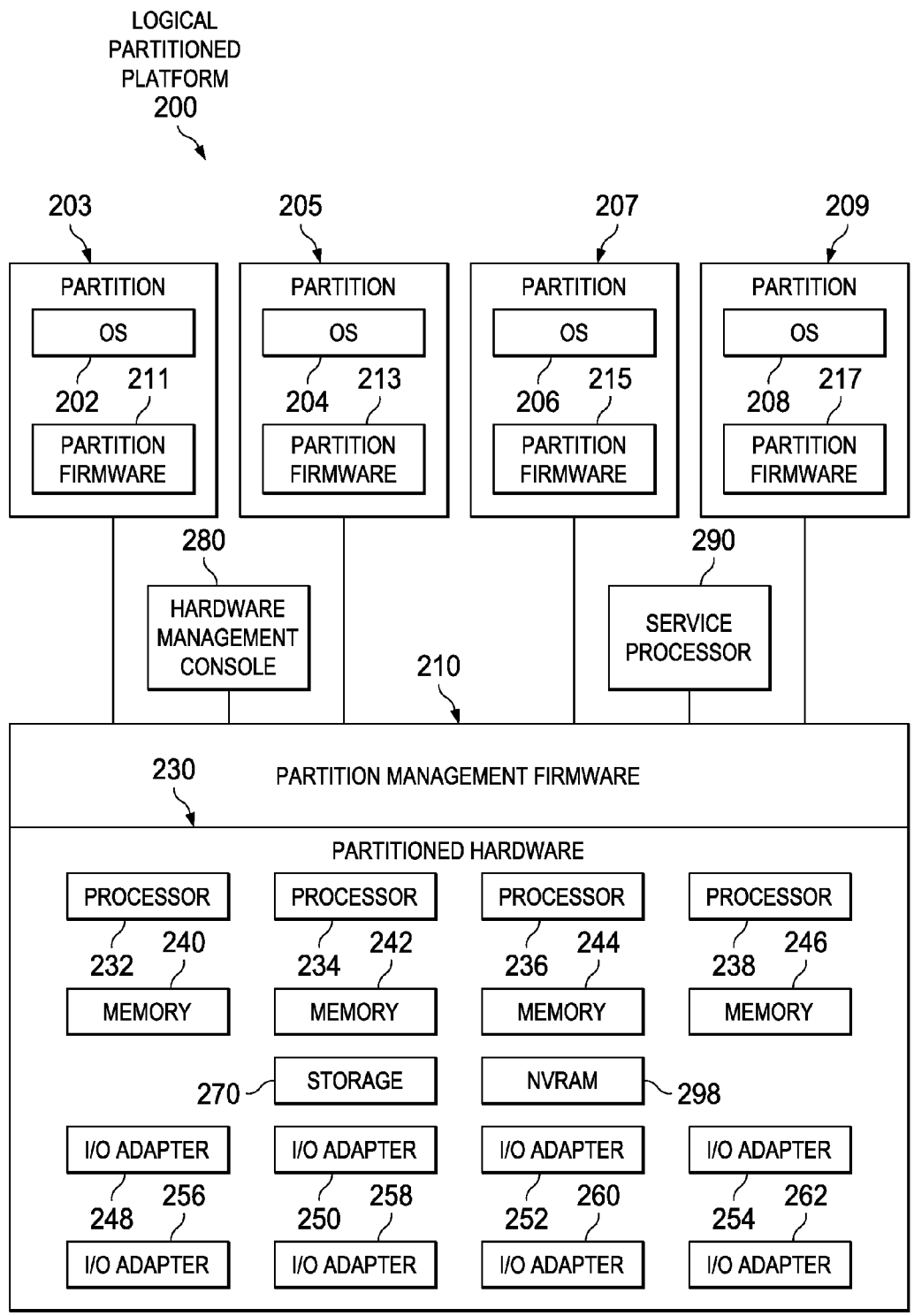
FIG. 2 is a block diagram of an exemplary logical partitioned platform in which illustrative embodiments may be implemented.

With reference now to FIG. 2, a block diagram of an exemplary logical partitioned platform is depicted in which illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor, which is available from International Business Machines Corporation. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes processors 232, 234, 236, and 238, memories 240, 242, 244, and 246, input/output (I/O) adapters 248, 250, 252, 254, 256, 258, 260, and 262, and a storage unit 270. Each of processors 232, 234, 236, and 238, memories 240, 242, 244, and 246, NVRAM storage 298, and I/O adapters 248, 250, 252, 254, 256, 258, 260, and 262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The illustrative embodiments describe a method for dynamically scanning various Boot Logical Volumes within a system to determine various operating systems and versions of operating systems located thereon. Currently, the bootlist command within the AIX operating system is capable of determining the various Boot Logical Volumes within a system. However, there is no method of determining various operating systems and versions of operating systems that are located on those various Boot Logical Volumes while within the System Management Service menu.

Illustrative embodiments described herein dynamically identify and scan special files associated with the various Boot Logical Volumes and the operating systems stored thereon. Once the special files are identified and scanned, the special files are mapped to a specific versions of operating systems. The specific version of the operating system within a boot logical volume can then be presented to the user in a format that does not require the user to have prior knowledge of the mappings of a certain operating system to a certain Boot Logical Volume.

The illustrative embodiments described herein provide a method for dynamically determining the contents of a Boot Logical Volume from within a System Management Service menu. Responsive to receiving the scan request, the system dynamically scans a root volume group to identify special files associated with the various base operating systems stored on the boot logical volumes of the root volume group. The system then maps the files to a specific operating systems version, and presents a list of the available operating systems on the various boot logical volumes to a user.

Figure 3:
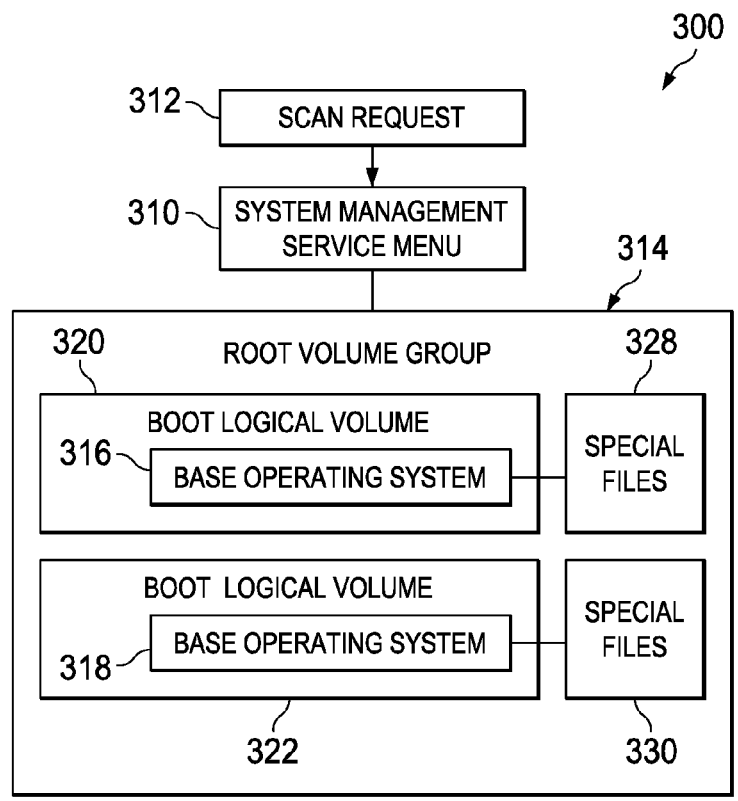
FIG. 3 is a dataflow for dynamically determining the contents of a Boot Logical Volume from within a System Management Service menu according to an illustrative embodiment.

Referring now to FIG. 3, a dataflow for dynamically determining the contents of a Boot Logical Volume from within a System Management Service menu is shown according to an illustrative embodiment. System 300 can be, for example, data processing system 100 of FIG. 1.

System Management Service menu 310 is a basic firmware user interface that can be provided as part of a system basic input/output system (BIOS) of a data processing system, such as data processing system 100 of FIG. 1, or within a partition, such as one of partitions 203, 205, 207, and 209 of FIG. 2.

Scan request 312 is a request input from a user into System Management Service menu 310 for determination of the various operating systems and versions of operating systems that are located within boot logical volumes of the system.

Upon receipt of scan request 312, system 300 scans root volume group 314 to determine base operating system 316 and base operating system 318 located within boot logical volume 320 and boot logical volume 322. Root volume group 314 can be located on one or more physical volumes, such as, for example, hard disk 150 of FIG. 1. Root volume group 314 is a base set of logical volumes required to start system 300 and any other logical volumes specified to the installation script. Boot logical volume 320 and boot logical volume 322 are logical volumes containing bootable instances of an operating system, such as base operating system 316 and base operating system 318.

System 300 identifies and scans special files 328 and special files 330 associated with boot logical volume 320 and boot logical volume 322. A special file, such as special files 328 and special files 330, is associated with a particular hardware device or other resource of the computer system. The operating system uses special files, sometimes called device files, to provide file I/O access to specific character and block device drivers.

Special files, such as special files 328 and special files 330, share many characteristics with ordinary files. For example, special files have path names that appear in a directory. Special files have the same access protection as ordinary files. Additionally, special files can be used in almost every way that ordinary files can be used.

However, there is an important difference between the two. An ordinary file is a logical grouping of data recorded on disk. A special file, such as special files 328 and special files 330, on the other hand, corresponds to a device entity. For example, a special file may correspond to an actual device, such as a line printer. A special file may correspond to a logical subdevice, such as a large section of the disk drive. Additionally, a special file may correspond to a pseudo device, such as the physical memory of the computer or the null file.

Special files, such as special files 328 and special files 330, can be distinguished from other files by having a file type stored in i-nodes to indicate the type of device access provided. An i-node for the special file also contains the device major and minor numbers assigned to the device at device configuration time. An i-node is a data structure on a traditional Unix-style file system that stores basic information about a file, directory, or other file system object.

Several special files are provided with the operating system. By convention, special files, such as special files 328 and special files 330, are located in the/dev directory.

In one illustrative embodiment, special files 328 and special files 330 are non-volatile random access memory (nvram) special files. The nvram character special file provides access to a machine device driver for accessing or modifying machine-specific nonvolatile RAM. The appropriate privilege is required to open the nvram special file. The nvram special file is used by machine-specific configuration programs to store or retrieve configuration and boot information using the nonvolatile RAM or ROM provided on the machine. The nvram special file supports open, close, read, and ioctl operations. Once system 300 identifies the configuration and boot information, system 300 is able to map the boot information to a specific operating system and operating system version of an operating system stored on a given boot logical volume, such as base operating system 316 and base operating system 318 stored on boot logical volume 320 and boot logical volume 322.

In one illustrative embodiment, special files 328 and special files 330 are logical volume device driver (lvdd) special files. Once system 300 has access to the logical volume device driver, system 300 can read data associated with each boot logical volume in order to determine the specific operating system and operating system version of an operating system stored thereon, such as base operating system 316 and base operating system 318.

Figure 4:
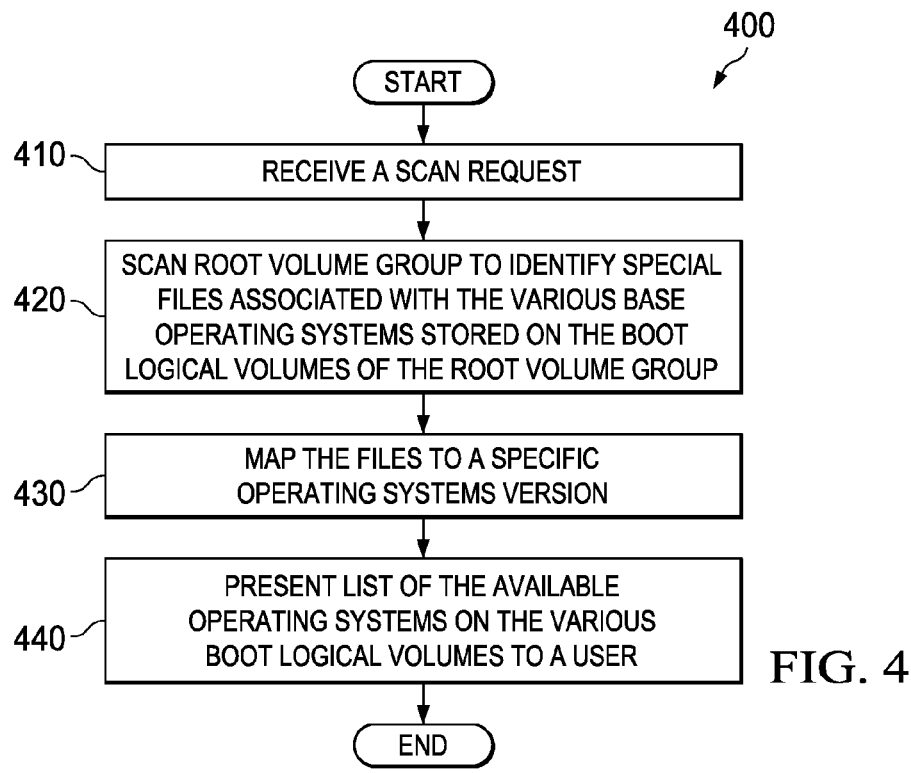
FIG. 4 is a flowchart for dynamically determining the contents of a Boot Logical Volume from within a System Management Service menu according to an illustrative embodiment.

Referring now to FIG. 4, a flowchart for dynamically determining the contents of a Boot Logical Volume from within a System Management Service menu is shown according to an illustrative embodiment. Process 400 is a software or firmware method, executing within firmware for a System Management Service menu, such as System Management Service menu 310 of FIG. 3.

Process 400 begins by receiving a scan request (step 410). The scan request is a request input from a user into a System Management Service menu for determination of the various operating systems and versions of operating systems that are located within boot logical volumes of the system. The scan request can be scan request 312 of FIG. 3.

Responsive to receiving the scan request, process 400 dynamically scans a root volume group to identify special files associated with the various base operating systems stored on the boot logical volumes of the root volume group (step 420). The special files are associated with a particular hardware device or other resource of the computer system. The operating system uses special files, sometimes called device files, to provide file I/O access to specific character and block device drivers. The special files can be, for example, special files 328 and special files 330 of FIG. 3.

Responsive to identifying the special files, process 400 maps the files to a specific operating systems version (step 430). The operating system can be, for example, one of base operating system 316 and base operating system 318 of FIG. 3.

Responsive to mapping the files to a specific operating systems version, process 400 presents a list of the available operating systems on the various boot logical volumes to a user (step 440), with the process terminating thereafter. The user can then easily select one of the operating systems from within the System Management Service menu for booting the system.

Thus, the illustrative embodiments described herein provide a method for dynamically determining the contents of a Boot Logical Volume from within a System Management Service menu. Responsive to receiving the scan request, the system dynamically scans a root volume group to identify special files associated with the various base operating systems stored on the boot logical volumes of the root volume group. The system then maps the files to a specific operating systems version, and presents a list of the available operating systems on the various boot logical volumes to a user.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for dynamically determining the contents of a boot logical volume from within a system management service menu, the method comprising:
   receiving a scan request, wherein the scan request is received from within the system management service menu, wherein the system management service menu is a basic firmware user interface provided as part of a basic input/output system of a data processing system;
   responsive to receiving a scan request, dynamically scanning at least one root volume group to identify a first set of special files associated with a first base operating system stored on a first boot logical volume of the at least one root volume group, wherein the first set of special files is associated with one of a particular hardware device or resource of the data processing system, wherein the first base operating system uses first set of special files to provide file input/output access to a first set of specific character device drivers, a first set of block device drivers, or combinations thereof;
   responsive to identifying the first set of special files, mapping the first set of special files to a first operating systems version corresponding to the first base operating system; and
   presenting the first operating systems version corresponding to the first base operating system to a user.

2. The computer implemented method of claim 1, further comprising:
   dynamically scanning at least one root volume group to identify a second set of special files associated with a second base operating system stored on a second boot logical volume of the at least one root volume group;
   responsive to identifying the second set of special files, mapping the second set of special files to a second operating systems version corresponding to the second base operating system; and
   presenting the second operating systems version corresponding to the second base operating system to the user.

3. The computer implemented method of claim 1, wherein the first set of special files is associated with a particular hardware device or particular resource of a computer system.

4. The computer implemented method of claim 1, wherein the first set of special files are non-volatile random access memory special files.

5. The computer implemented method of claim 1, wherein the first set of special files are logical volume device driver special files.

6. The computer implemented method of claim 2, wherein the first base operating system is a first version of an operating system respecting a division between a user-space and a kernel-space, and wherein the second base operating system is a second version of the operating system respecting the division between the user-space and the kernel-space.

7. A computer program product for dynamically determining the contents of a boot logical volume from within a system management service menu, the computer program product comprising:
   a computer readable storage medium having computer readable program code embodied therewith, the computer readable program code comprising:
   computer readable program code configured to receive a scan request, wherein the scan request is received from within the system management service menu, wherein the system management service menu is a basic firmware user interface provided as part of a basic input/output system of a data processing system;
   computer readable program code configured, responsive to receiving a scan request, to dynamically scan at least one root volume group to identify a first set of special files associated with a first base operating system stored on a first boot logical volume of the at least one root volume group, wherein the first set of special files is associated with one of a particular hardware device or resource of the data processing system, wherein the first base operating system uses first set of special files to provide file input/output access to a first set of specific character device drivers, a first set of block device drivers, or combinations thereof;
   computer readable program code configured, responsive to identifying the first set of special files, to map the first set of special files to a first operating systems version corresponding to the first base operating system; and
   computer readable program code configured to present the first operating systems version corresponding to the first base operating system to a user.

8. The computer program product of claim 7, further comprising:
   computer readable program code configured to dynamically scan at least one root volume group to identify a second set of special files associated with a second base operating system stored on a second boot logical volume of the at least one root volume group;
   computer readable program code configured, responsive to identifying the second set of special files, to map the second set of special files to a second operating systems version corresponding to the second base operating system; and
   computer readable program code configured to present the second operating systems version corresponding to the second base operating system to the user.

9. The computer program product of claim 7, wherein the first set of special files is associated with a particular hardware device or particular resource of a computer system.

10. The computer program product of claim 7, wherein the first set of special files are non-volatile random access memory special files.

11. The computer program product of claim 7, wherein the first set of special files are logical volume device driver special files.

12. The computer program product of claim 8, wherein the first base operating system is a first version of an operating system respecting a division between a user-space and a kernel-space, and wherein the second base operating system is a second version of the operating system respecting the division between the user-space and the kernel-space.

13. A data processing system comprising:
a storage having a computer program product encoded thereon for dynamically determining the contents of a boot logical volume from within a system management service menu;
a bus system connecting the storage to a processor; and
a processor, wherein the processor executes to the computer program product:
to receive a scan request, wherein the scan request is received from within the system management service menu, wherein the system management service menu is a basic firmware user interface provided as part of a basic input/output system of a data processing system; responsive to receiving a scan request, to dynamically scan at least one root volume group to identify a first set of special files associated with a first base operating system stored on a first boot logical volume of the at least one root volume group, wherein the first set of special files is associated with one of a particular hardware device or resource of the data processing system, wherein the first base operating system uses first set of special files to provide file input/output access to a first set of specific character device drivers, a first set of block device drivers, or combinations thereof; responsive to identifying the first set of special files, to map the first set of special files to a first operating systems version corresponding to the first base operating system; and to present the first operating systems version corresponding to the first base operating system to a user.

14. The data processing system of claim 13, wherein the processor further executes to the computer program product:
to dynamically scan at least one root volume group to identify a second set of special files associated with a second base operating system stored on a second boot logical volume of the at least one root volume group; to identifying the second set of special files, to map the second set of special files to a second operating systems version corresponding to the second base operating system; and to present the second operating systems version corresponding to the second base operating system to the user.

15. The data processing system of claim 13, wherein the first set of special files is associated with a particular hardware device or particular resource of a computer system.

16. The data processing system of claim 13, wherein the first set of special files are non-volatile random access memory special files.

17. The data processing system of claim 13, wherein the first set of special files are logical volume device driver special files.

18. The data processing system of claim 14, wherein the first base operating system is a first version of an operating system respecting a division between a user-space and a kernel-space, and wherein the second base operating system is a second version of the operating system respecting the division between the user-space and the kernel-space.

* * * * *